US008689577B2

(12) United States Patent
Fukushima et al.

(10) Patent No.: US 8,689,577 B2
(45) Date of Patent: Apr. 8, 2014

(54) INDOOR UNIT, AIR CONDITIONER INCLUDING INDOOR UNIT AND METHOD OF CONTROLLING AIR CONDITIONER

(75) Inventors: Toshio Fukushima, Gunma (JP); Toru Arakawa, Gunma (JP); Hiroyuki Kobayashi, Gunma (JP); Takuro Nishihara, Gunma (JP); Hiroaki Usui, Gunma (JP); Yoichi Uchida, Tochigi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 11/839,718

(22) Filed: Aug. 16, 2007

(65) Prior Publication Data

US 2008/0047281 A1 Feb. 28, 2008

(30) Foreign Application Priority Data

Aug. 25, 2006 (JP) ................................. 2006-228572
Aug. 25, 2006 (JP) ................................. 2006-228752

(51) Int. Cl.
*F25D 17/04* (2006.01)
(52) U.S. Cl.
USPC ................................. 62/317; 62/78; 261/106
(58) Field of Classification Search
USPC ............... 62/78, 311, 318, 317; 261/103, 106
See application file for complete search history.

(56) References Cited

U.S. PATENT DOCUMENTS

| 3,171,401 | A | 3/1965 | McDuffee |
| 5,379,609 | A | 1/1995 | Matsumoto et al. |
| 7,114,346 | B2 * | 10/2006 | Kucera et al. ................... 62/314 |
| 7,461,513 | B2 * | 12/2008 | Broerman et al. .................. 62/5 |
| 2004/0011665 | A1 | 1/2004 | Koizumi et al. |
| 2005/0072308 | A1 | 4/2005 | Aoyagi |
| 2005/0115213 | A1 * | 6/2005 | Lim et al. ...................... 55/385.2 |
| 2006/0273470 | A1 * | 12/2006 | Takahashi et al. ................. 261/4 |

FOREIGN PATENT DOCUMENTS

DE 10157187 A1 6/2003
EP 1348448 A1 10/2003
(Continued)

OTHER PUBLICATIONS

Machine translation of JP2003-227622.*
(Continued)

*Primary Examiner* — Lakiya Rogers
(74) *Attorney, Agent, or Firm* — Westerman, Hattori, Daniels & Adrian, LLP

(57) ABSTRACT

An in-ceiling embedded type air conditioner including an indoor unit having an air blower and an indoor heat exchanger accommodated in a housing a substantially box-shape, and a filtering unit including a gas-liquid contact member that is disposed at the downstream side of the indoor heat exchanger on an air blowing passage through which air sucked by the air blower flows in the indoor unit and infiltrated with electrolytic water generated by electrolyzing water, the air and the electrolytic water being brought into contact with each other in the gas-liquid contact member, whereby the air cooled or heated in the indoor heat exchanger is filtered, that is, virus, etc. contained in the air is inactivated, sterilized or the like and then blown out to a room to be air-conditioned.

9 Claims, 10 Drawing Sheets

(56) References Cited

FOREIGN PATENT DOCUMENTS

| | | | |
|---|---|---|---|
| JP | 04-278134 | A | 10/1992 |
| JP | 04-320743 | A | 11/1992 |
| JP | 07-019546 | A | 1/1995 |
| JP | 09-060915 | A | 3/1997 |
| JP | 09-170793 | A | 6/1997 |
| JP | 2002-181358 | A | 6/2002 |
| JP | 2002181358 | A | 6/2002 |
| JP | 2002257400 | A | 9/2002 |
| JP | 2003227622 | A | 8/2003 |
| JP | 2003-250876 | A | 9/2003 |
| JP | 2003-254551 | A | 9/2003 |
| JP | 2005069631 | A | 3/2005 |
| JP | 2006-136485 | A | 6/2006 |

OTHER PUBLICATIONS

Machine Translation: JP2006-300486; Harada Toshio; Published Oct. 28, 1994.*
Office Action mailed May 8, 2009 in corresponding Canadian Patent Application No. 2,598,131.
Japanese Office Action dated Jun. 14, 2011, issued in corresponding Japanese Patent Application No. 2006-228572.
Canada Office Action dated Feb. 5, 2010, issued in corresponding Canada Patent Application No. 2,598,131.
U.S. Office Action dated Jun. 26, 2013, issued in corressponding U.S. Appl. No. 12/485,689.
Japanese Office Action dated Nov. 8, 2011, issued in corresponding Japanese Patent Application No. 2006-228572.

* cited by examiner

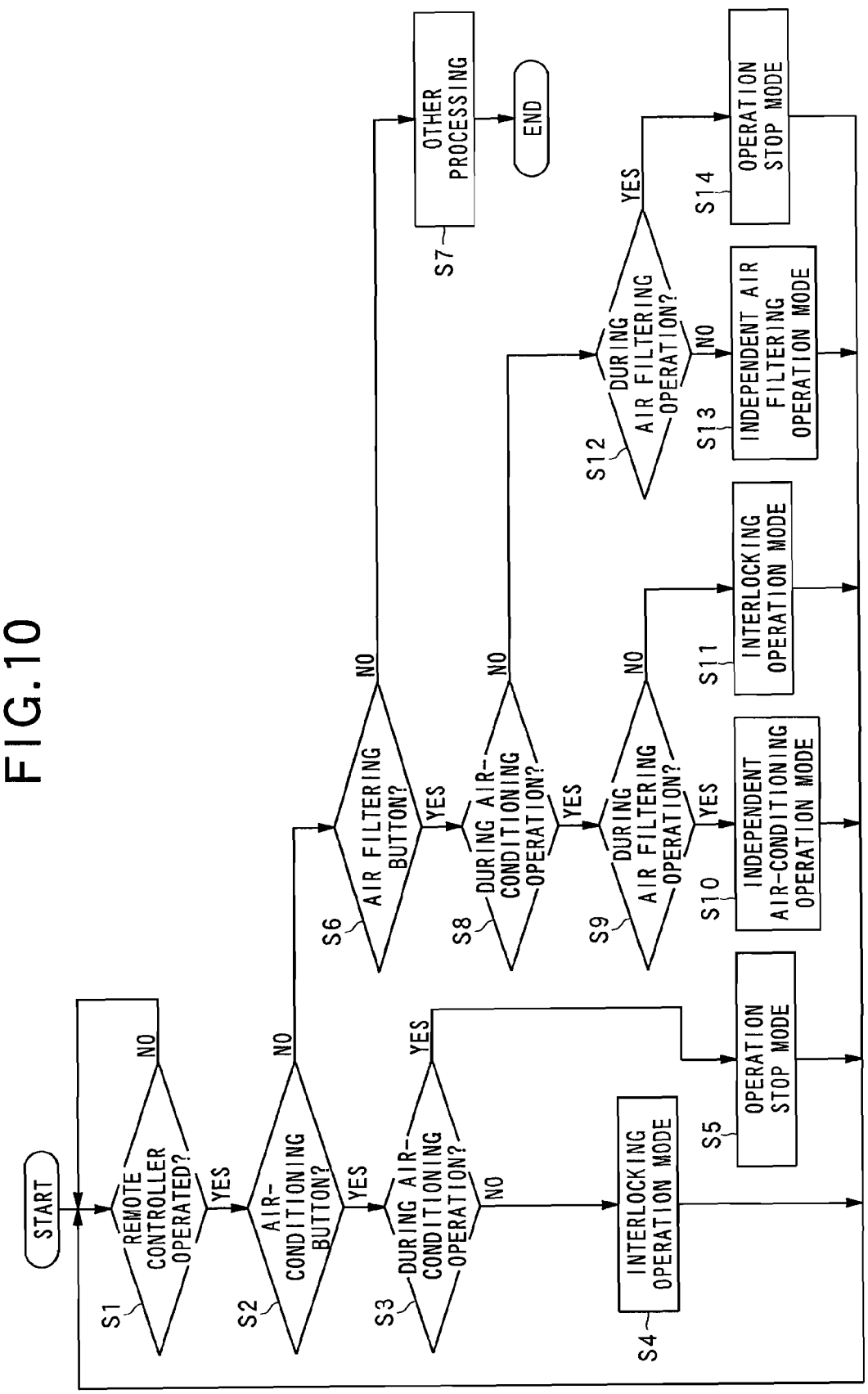

INDOOR UNIT, AIR CONDITIONER INCLUDING INDOOR UNIT AND METHOD OF CONTROLLING AIR CONDITIONER

INCORPORATION BY REFERENCE

The present application claims priority under 35 U.S.C. §119 to Japanese Patent Application No. 2006-228752 filed on Aug. 25, 2006 and Japanese Patent Application No. 2006-228572 filed on Aug. 25, 2006. The content of the applications is incorporated herein by reference in its entirety.

BACKGROUND OF THE INVENTION

1. Field of the Invention

The present invention relates to an indoor unit, an air conditioner having the indoor unit and a method of controlling the air conditioner.

2. Description of the Related Art

Microorganism such as bacteria, virus, fungus, etc. (hereinafter referred to as "virus, etc.") float in indoor air, and thus air blown out from an air conditioner also unexceptionally contains virus, etc. If the virus, etc. contained in indoor air are inactivated, sterilized, decomposed, removed or the like (hereinafter referred to as "filtered") and then the filtered air is blown out from the air conditioner into the room, it is expected to have an effect of lowering the risk of infection, induction of allergy, adverse effect, etc. to people with weak defense power or even general people in congested areas, and it can be practically used.

In view of this problem, there is known an air cleaning technique for an air conditioner to which an air cleaner for oxidizing, decomposing and removing harmful materials from air is connected. According to this method, air is once sucked from a room and filtered to oxidize, decompose and remove harmful materials from the air, and then returned to the air conditioner. The filtered air is air-conditioned in the air conditioner and then clean air is blown out to the room (for example, JP-A-2003-250876).

In this air cleaning technique, however, the air cleaner is assembled and installed separately from the air conditioner, and they are connected to each other through air flowing pipes. Accordingly, the overall construction of the air conditioner and the air cleaner are excessively large, that is, this technique requires a large installation space. Furthermore, the air conditioner and the air cleaner must be manufactured and fabricated separately from each other, and thus the total number of parts constituting the air conditioner and the air cleaner must be increased, so that the manufacturing cost thereof is increased. In addition, with respect to the maintenance of the air conditioner and the air cleaner, they must be separately subjected to maintenance and check works. Therefore, the maintenance and check works are cumbersome.

SUMMARY OF THE INVENTION

The present invention has been implemented in view of the foregoing problems, and has an object to provide an air conditioner having air filtering capability such as inactivation, sterilization, decomposition, etc. of virus, etc. floating in the air.

Furthermore, the present invention has an object to provide an air conditioner having air filtering capability in which an air conditioning operation and an air filtering operation can be freely and selectively performed with a simple operation, and a method of controlling the air conditioner concerned.

In order to attain the above objects, according to a first aspect of the present invention, an indoor unit of an in-ceiling embedded type air conditioner including an air blower and an indoor heat exchanger accommodated in a housing a substantially box-shape, comprises: a filtering unit including a gas-liquid contact member that is disposed at the downstream side of the indoor heat exchanger on an air blowing passage through which air sucked by the air blower flows in the indoor unit and infiltrated with electrolytic water generated by electrolyzing water, the air and the electrolytic water being brought into contact with each other in the gas-liquid contact member to filter the air.

According to the above indoor unit, the air passing through the indoor heat exchanger is passed through the gas-liquid contact member filtrated with electrolytic water, whereby the air is filtered. Therefore, virus, etc. contained in the air whose temperature is adjusted by cooling or heating can be inactivated or removed. Accordingly, the air conditioner can be brought with the air filtering function. Furthermore, the indoor unit of the in-ceiling embedded air conditioner suffers no restriction of the installation space on the floor surface of the room to be air-conditioned. Therefore, the user can keep the indoor air clean while avoided from being loaded to secure the installation space.

In the above indoor unit, it is preferable that the housing has an opening portion at at least a part of the side surface thereof and the gas-liquid contact member is inserted from the opening portion into the housing.

In this case, the opening portion is provided in the side surface of the housing of the indoor unit, and thus the gas-liquid contact member can be easily secured to the indoor unit by inserting the gas-liquid contact member through the opening portion.

In the above indoor unit, it is preferable that the filtering unit further comprises a plate-shaped member covering the opening portion, and an electrolytic bath for generating the electrolytic water, and the electrolytic bath is fixed to one surface of the plate-shaped member, and the gas-liquid contact member is fixed to the other surface of the plate-shaped member.

According to the above construction, the plate-shaped member is fixed to the housing and the gas-liquid contact member and the electrolytic bath are simultaneously fixed to the plate-shaped member, whereby the gas-liquid contact member and the electrolytic bath can be easily secured to the indoor unit. Furthermore, the gas-liquid contact member and the electrolytic bath are proximate to each other, and thus the electrolytic water generated in the electrolytic bath can be quickly supplied to the gas-liquid contact member.

In the above indoor unit, it is preferable that the filtering unit further comprises a water supply pipe that is disposed along a refrigerant pipe connected to the indoor heat exchanger and supplies water to the electrolytic bath.

In this case, when the indoor unit is embedded in the ceiling, a connection work of the water supply pipe and the refrigerant pipe can be collectively performed, and thus the installation work can be simplified.

In the above indoor unit, it is preferable that the filtering unit further comprises an electrolytic bath that is disposed at the outside of the housing and generates the electrolytic water.

According to this construction, the electrolytic water is generated by the electrolytic bath which is located outside the housing, and thus the electrolytic bath does not disturb flow of air in the housing of the indoor unit and also does not narrow the air flow passage. Therefore, unfavorable matters such as increase of the air flowing resistance, etc. are not induced, and the space in the housing can be effectively used. Furthermore, the maintenance of the electrolytic bath can be simply performed from the outside of the housing of the air conditioner.

In the above indoor unit, it is preferable that the filtering unit further comprises a water supply pipe that is disposed along a refrigerant pipe connected to the indoor heat exchanger and supplies water to the electrolytic bath.

In this case, when the indoor unit is embedded in the ceiling, a connection work of the water supply pipe and the refrigerant pipe can be collectively performed, and thus the installation work can be simplified.

In the above indoor unit, it is preferable that the filtering unit comprises a drain pan that is disposed below the indoor heat exchanger and receives drain water from the indoor heat exchanger, a drain pump for discharging drain water from the drain pan, an electrolytic water supply unit for supplying the electrolytic water to the gas-liquid contact member from the upper side thereof so that the electrolytic water infiltrates the gas-liquid contact member, an electrolytic water tray that is disposed below the gas-liquid contact member and receives electrolytic water dropped from the gas-liquid contact member, and a discharge pipe for discharging electrolytic water stocked in the electrolytic water tray to the drain pan.

According to this construction, the electrolytic water supplied to the gas-liquid contact member is dropped from the gas-liquid contact member and discharged to the drain pan. Therefore, the electrolytic water can be easily discharged together with the drain water. Furthermore, the electrolytic water having sterilization power flows in the drain pan, and thus breeding of various bacteria, etc. in the drain pan can be suppressed. Still furthermore, the electrolytic water dropped to the gas-liquid contact member is temporarily stocked in the electrolytic water tray and then flows to the drain pan. Therefore, the discharge of the electrolytic water from the electrolytic water tray to the drain pan can be controlled by opening/closing the discharge pipe. Accordingly, for example, the electrolytic water in the electrolytic water tray is not discharge, but circulated and re-used, so that the electrolytic water can be efficiently used.

In the above indoor unit, it is preferable that the drain pump is disposed at one corner of the housing, and the gas-liquid contact member is disposed along the side surface of the housing so as to be adjacent to the locating position of the drain pump.

According to this construction, the gas-liquid contact member and the electrolytic water tray are located in the neighborhood of the drain pump. Therefore, the electrolytic water discharged to the drain pan quickly reaches the drain pump, and also is quickly discharged by the drain pump. Accordingly, the electrolytic water does not stay in the drain pan for a long time, and thus the effect of the electrolytic water on the indoor heat exchanger can be minimized. Therefore, for example, when an anticorrosive treatment is conducted on the indoor heat exchanger, the treatment area can be minimized.

In the above indoor unit, it is preferable that the filtering unit further comprises a circulating and supplying unit for circulating and supplying electrolytic water stocked in the electrolytic water tray to the gas-liquid contact member.

According to the above construction, the electrolytic water can be circulated and efficiently used, so that the user amount of water can be suppressed.

According to a second aspect of the present invention, an air conditioner including an outdoor unit having a compressor and an outdoor heat exchanger, and an indoor unit having an air blower and an indoor heat exchanger, the outdoor unit and the indoor unit being connected to each other through a joint pipe, comprises: an air filtering apparatus including a gas-liquid contact member that is disposed on an air flowing passage formed by the air blower of the indoor unit and infiltrated with electrolytic water containing active oxygen species so that air passing through the gas-liquid contact member is brought into contact with the electrolytic water to filter the air; and a controller for controlling the air conditioner having the air filtering apparatus, and selectively executing, as an operation mode, an interlocking operation mode for interlocking an air-conditioning operation based on the air conditioner and an air filtering operation based on the air filtering apparatus, and an independent air filtering operation mode for executing only the air filtering operation based on the air filtering apparatus without executing the air-conditioning operation based on the air conditioner.

According to the above air conditioner, the interlocking operation mode and the operation stop mode can be executed under the control of the controller. When the interlocking operation mode is executed, the indoor air executes the air conditioning operation of the room, and also executes the air filtering operation. Accordingly, the air filtering operation can be executed interlockingly with the air-conditioning operation, or the air filtering operation can be stopped interlockingly with the stop of the air-conditioning operation. Furthermore, when the independent air filtering operation mode is executed, only the air filtering operation can be executed. Accordingly, the interlocking operation mode in which the air-conditioning operation and the air filtering operation are interlocked with each other and the independent air filtering operation mode in which only the air filtering operation is executed can be easily switched therebetween and executed.

It is preferable that the above air conditioner further comprises a switching operation unit for instructing switching of the operation mode. Furthermore, according to an instruction from the switching operation unit, the controller shifts the operation mode to anyone mode of an independent air-conditioning mode for stopping the air filtering operation based on the air filtering apparatus during execution of the interlocking operation mode and executing the air-conditioning operation, and the interlocking operation mode for starting the air filtering operation based on the air filtering apparatus during execution of the independent air-conditioning mode and executing both the air-conditioning operation and the air filtering operation.

In this case, by user's operation of the switching operation unit, the operation mode can be shifted to the independent air-conditioning operation mode of stopping the air filtering operation during executing of the interlocking operation mode and executing the air-conditioning operation, and also the operation mode can be shifted to the interlocking operation mode in which the air filtering operation based on the air filtering apparatus is started during execution of the independent air-conditioning operation mode. Accordingly, the operation modes achieved by combining the air-conditioning operation and the air filtering operation can be switched and executed.

In the above air conditioner, it is preferable that the controller controls the indoor unit to execute air blowing operation based on the air blower in the independent air filtering mode.

In this case, by driving the air blower for air-conditioning operation under the state that only the air filtering apparatus is operated, the filtered air can be supplied to the room without providing any air blower dedicated to the air filtering apparatus.

According to a third aspect of the present invention, a method of controlling an air conditioner including an outdoor unit having a compressor and an outdoor heat exchanger, an indoor unit having an air blower and an indoor heat exchanger, and an air filtering apparatus including a gas-liquid contact member that is disposed on an air flowing passage formed by the air blower of the indoor unit and infiltrated with electrolytic water containing active oxygen species so that air passing through the gas-liquid contact member is brought into contact with the electrolytic water to filter the air, the air conditioner having the air filtering apparatus being operated in each of operation modes including an interlocking operation mode for interlocking an air-conditioning operation based on the air conditioner and an air filtering operation based on the air filtering apparatus, and an independent air filtering operation mode for executing only the air filtering operation based on the air filtering apparatus without executing the air-conditioning operation based on the air conditioner, comprises: a step of detecting an instruction of starting the air-conditioning operation or the air filtering operation; a step of judging whether the air conditioner is now under operation or under non-operation; and a step of starting the interlocking operation mode when an instruction of starting the air-conditioning operation is detected and it is also judged that the air conditioner is now under non-operation, and starting the independent air filtering operation mode when an instruction of starting the air filtering operation is detected and the air conditioner is now under non-operation.

According to the above air conditioner and the above method, the interlocking operation mode of interlocking the air-conditioning operation and the air filtering operation based on the air filtering apparatus, and the independent air filtering operation mode of executing only the air filtering operation based on the air filtering apparatus are provided, and various operation states in which only the air filtering operation is executed, both the air-conditioning operation and the air filtering operation are executed/stopped interlockingly with each other, etc. can be switched to one another by a simple operation, so that the operationality can be enhanced.

BRIEF DESCRIPTION OF THE DRAWINGS

FIGS. 4A and 4B are diagrams showing the construction of the main part of an filtering unit of the air filtering apparatus, wherein FIG. 4A shows an air filtering portion, and FIG. 4B shows an electrolytic water supply unit;

FIG. 10 is a flowchart showing the operation of the air filtering apparatus shown in FIG. 8.

PREFERRED EMBODIMENTS OF THE PRESENT INVENTION

Preferred embodiments according to the present invention will be described hereunder with reference to the accompanying drawings.

In the following embodiments, a four-way blow-out and in-ceiling embedded type air conditioner will be described as an example of an air conditioner according to the present invention. However, the type of the air conditioner is not limited to the above type, and various types of air conditioners such as a ceiling-suspended type air conditioner, a wall-suspended type air conditioner, an on-floor mount type air conditioner, etc. may be adopted.

First Embodiment

Figure 1:
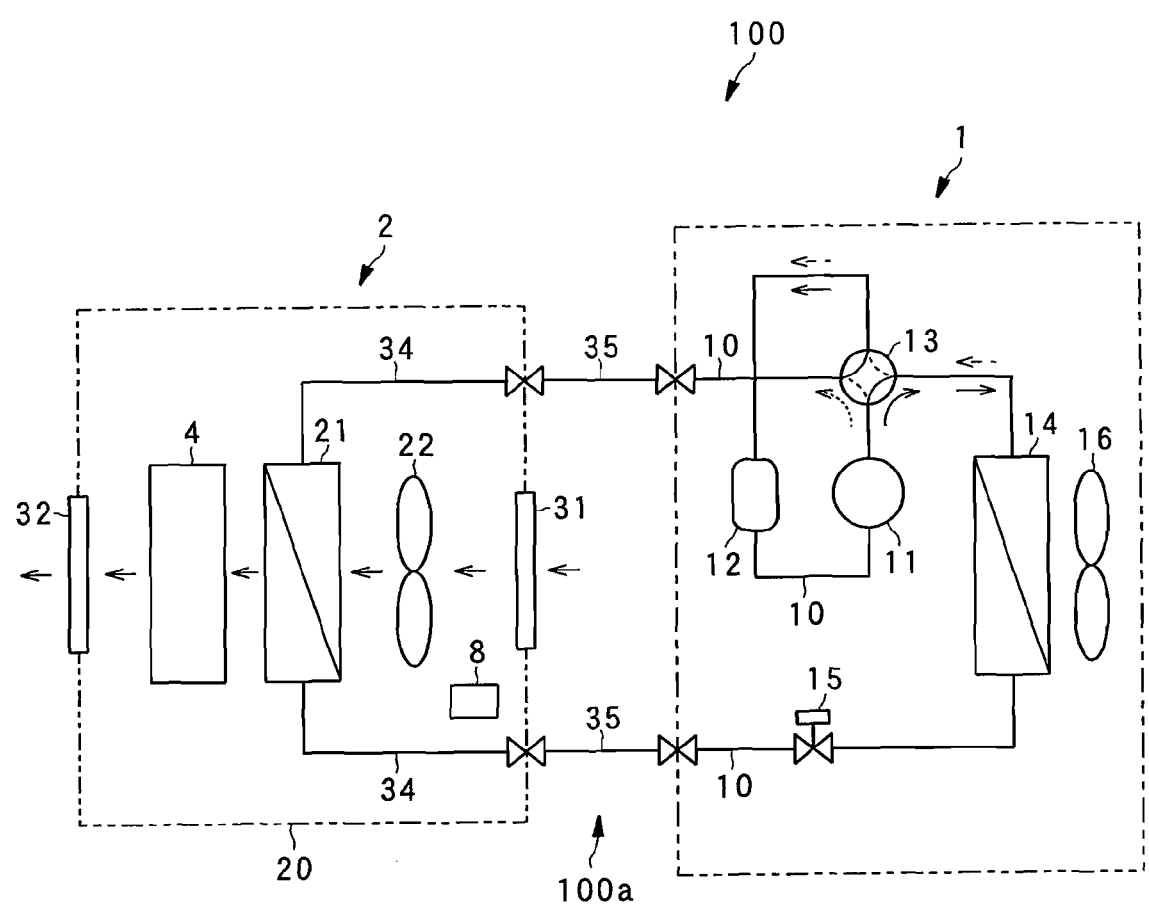
FIG. 1 is a diagram showing the construction of an air conditioner equipped with an air filtering apparatus according to a first embodiment of the present invention.

FIG. 1 shows the construction of an air conditioner 100 according to a first embodiment of the present invention. The air conditioner 100 according to the first embodiment is a separation type heat pump air conditioner having an outdoor unit 1 and an indoor unit 2. An outdoor refrigerant pipe 10 of the outdoor unit 1 and an indoor refrigerant pipe 34 of the indoor unit 2 are connected to each other through a connection pipe 35, and the outdoor unit 1 and the indoor unit 2 are controlled by a controller 8.

The outdoor unit 1 is installed outdoors. As shown in FIG. 1, a compressor 11 is disposed in the outdoor refrigerant pipe 10, an accumulator 12 is connected to the suction side of the compressor 11, and a four-way valve 13, an outdoor heat exchanger 14 and an electrically-driven expansion valve 15 are successively connected to the discharge side of the compressor 11 in this order. Furthermore, an outdoor fan 16 for blowing air to the outdoor heat exchanger 14 is disposed in the outdoor unit 1.

The indoor unit 2 is installed in a room to be air-conditioned. As shown in FIG. 1, the indoor unit 2 includes a housing having an air suction port 31 and an air blow-out port 32, an indoor heat exchanger 21, an air blowing fan (air blower) 22 for making air flow from the air suction port 31 to the air blow-out port 32, and an air filtering unit 4 which is disposed in an air flowing passage formed in the housing 20 by the air blowing fan 22 and brings air heat-exchanged in the indoor heat exchanger 21 into contact with electrolytic water containing active oxygen species to filter the air.

The controller 8 is equipped with CPU (not shown), ROM for storing a control program executed by CPU, control data associated with the control program, etc., and RAM for temporarily storing programs executed by CPU and various kinds of data. The controller further has an infrared receiver for receiving an infrared signal transmitted from a remote controller (not shown) out of the indoor unit 2. CPU receives an instruction from the remote controller on the basis of the infrared signal received by the infrared receivers, reads out the control program stored in ROM according to this instruction, develops the control program in RAM and executes the control program, thereby controlling the overall air conditioner 100.

In the air conditioner 100, the flow direction of refrigerant flowing in the refrigerant circuit 100a is switched by switching the four-way valve 13, whereby a cooling operation and a heating operation are switched therebetween. Under cooling operation, the refrigerant flows in a direction indicated by a solid-line arrow shown in FIG. 1, and under heating operation, the refrigerant flows in a direction indicated by a broken-line arrow in FIG. 1.

That is, under cooling operation, high-pressure refrigerant discharged from the compressor 11 passes through the accumulator 12 and reaches the outdoor heat exchanger 14. The refrigerant concerned is condensed in the outdoor heat exchanger 14, and fed to the electrically-driven expansion valve 15. This high-pressure refrigerant is passed through the electrically-driven expansion valve 15 while expanding, evaporated in the indoor heat exchanger 21 and then returned to the suction side of the compressor 11. Under heating operation, the high-pressure refrigerant discharged from the compressor 11 is passed through the outdoor refrigerant pipe 10, fed to the indoor heat exchanger 21, condensed in the indoor heat exchanger 21 and then fed to the electrically-driven expansion valve 15. This refrigerant expands in the electrically-driven expansion valve 15, and it is fed to the outdoor heat exchanger 14, evaporated in the outdoor heat exchanger 14, fed through the four-way valve 13 to the accumulator 12 and then returned to the suction side of the compressor 11.

Figure 2:
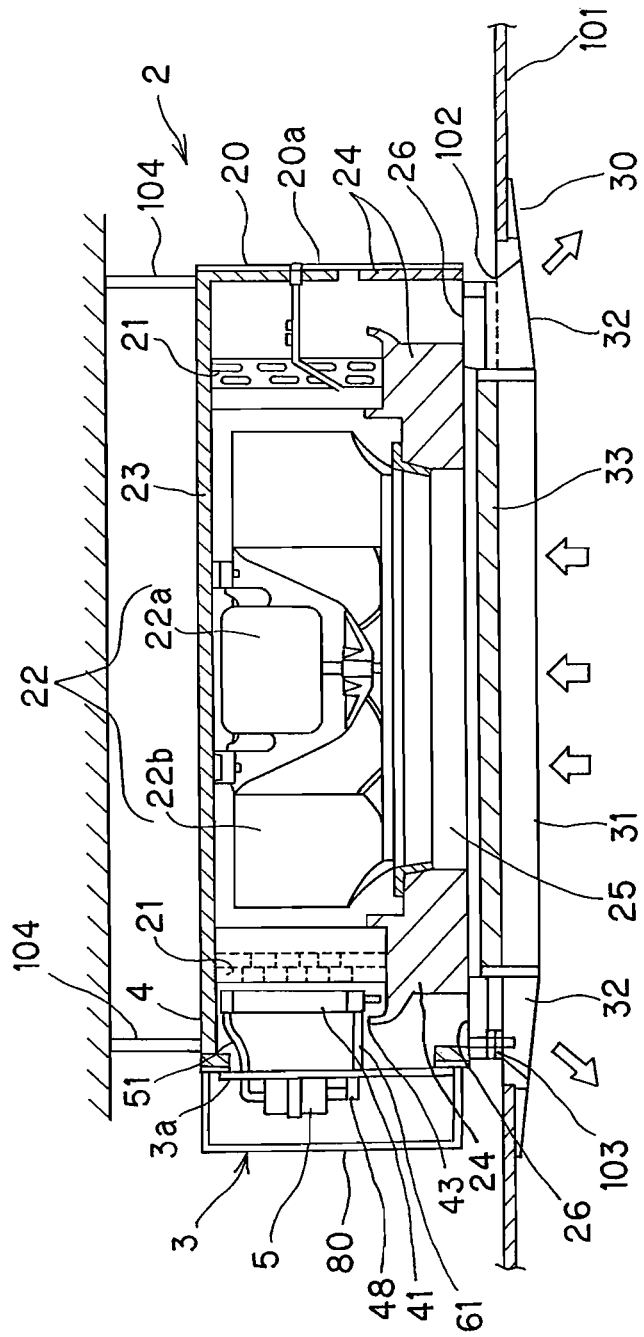
FIG. 2 is a cross-sectional view showing the construction of an indoor unit of the air conditioner in which the air filtering apparatus is equipped.
Figure 3:
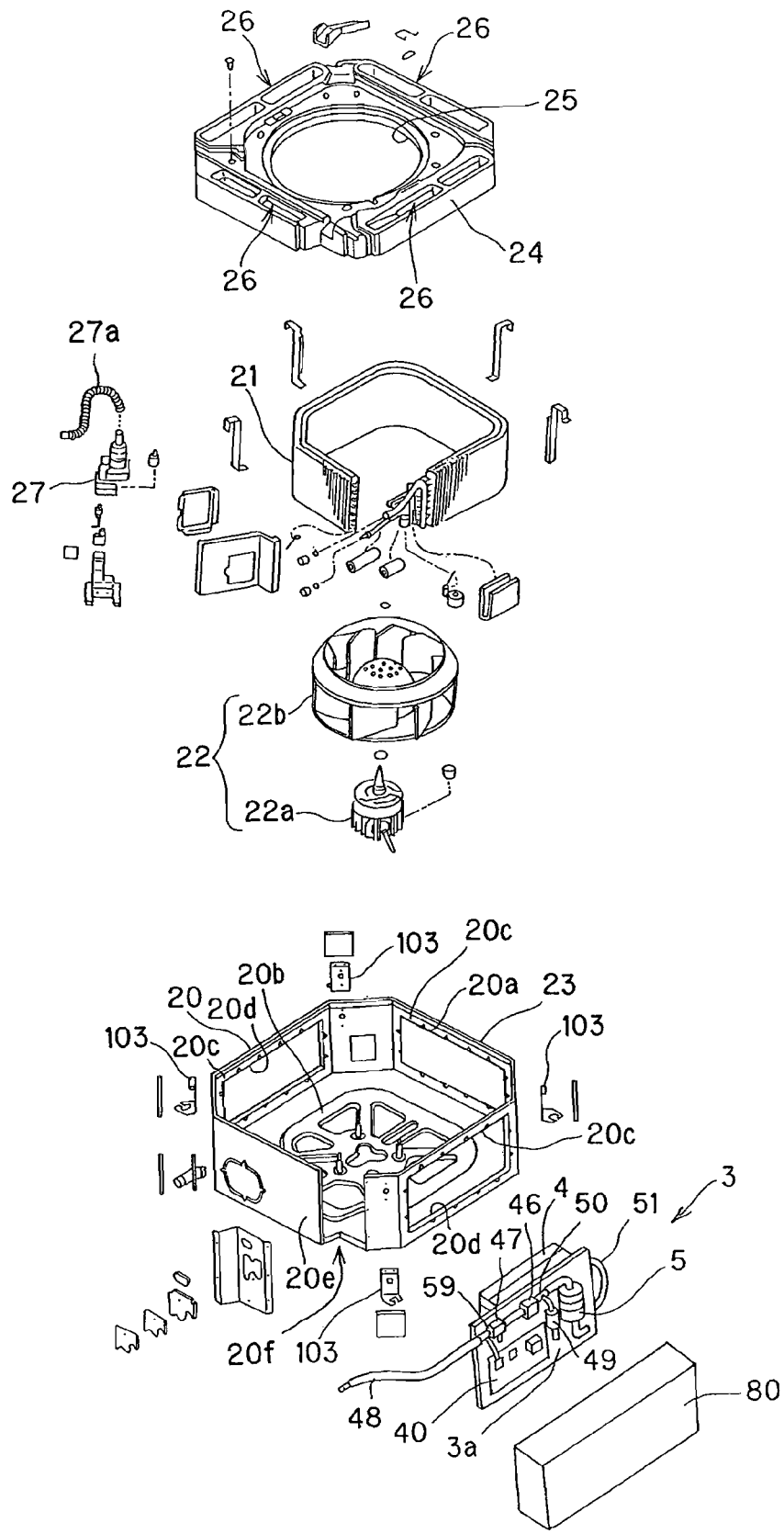
FIG. 3 is an exploded perspective view of the indoor unit having the air filtering apparatus shown in FIG. 1.

FIG. 2 is a side cross-sectional view showing a state that the indoor unit of the air conditioner according to the first embodiment of the present invention is embedded in the ceiling. FIG. 3 is an exploded perspective view showing the state that the indoor unit 2 shown in FIG. 2 is exploded while the upper and lower sides thereof are inverted.

The indoor unit 2 has a housing 20 in which the indoor heat exchanger 21, the controller 8, etc. are accommodated, and a face panel 30 is secured to the front side (room side) of the housing 20. As shown in FIG. 2, the face panel 30 is located at the lower side of the housing 2 under the state that the indoor unit 2 is secured to the ceiling as shown in FIG. 2.

The housing 20 is designed in a substantially rectangular box-shape having an opened front face (the lower-side face of the housing 20 in FIG. 2 or the upper-side face of the housing 20 in FIG. 3).

The side surface of the housing 20 is constructed by joining three substantially rectangular side plates 20a and one substantially rectangular side plate 20e. Another flat plate is interposed at each joint portion of the respective side plates, and these side plates constitute a substantially octagonal frame as a whole.

A knock-out hole portion 20c is formed at each side plate 20a. The knock-out hole portion 20c is a substantially rectangular hole covered by one plate constituting the side plate 20a. By pushing the knock-out hole portion 20c as occasion demands, the plate covering the hole drops off and thus the knock-out portion 20c is opened. The opening formed by pushing the knock-out hole portion 20c is referred to as an opening portion 20d.

A cut-out portion 20f is formed at one end side of the side plate 20e so as to guide the indoor refrigerant pipe 34, etc. connected to the indoor heat exchanger 21 in the indoor unit 2.

The face panel 30 is substantially rectangular in plan view, and more specifically it is formed in a substantially square shape. The opening face of the housing 20 and the ceiling hole 102 are covered by the face panel. The face panel 30 is provided with an air suction port 31 located at the substantially center portion in plan view and air blow-out ports 32 which are disposed in the neighborhood of the four sides of the face panel 30 so as to extend along the four sides. The air blow-out ports 32 extend substantially in parallel to the side plates 20a, 20e, and it is configured so that air passing through the indoor heat exchanger 21 described later can be efficiently discharged to a room to be air-conditioned.

Furthermore, a filter 33 is mounted inside the air suction port 31, that is, at the back side of the ceiling 101. Accordingly, the indoor unit 2 sucks indoor air from the air suction port into the housing 20, heat-exchanges the air in the housing 20 and then blows out the heat-exchanged air in the four directions from the four air blow-out ports 32 into the room to be air-conditioned.

Suspending tags 103 are secured to the four corners of the housing 20. As shown in FIG. 2, the indoor unit 2 is embedded in the direction from the room to the back side of the ceiling 101 into the ceiling hole 102 formed in a substantially rectangular shape of the ceiling 101 of a building in which the indoor unit 1 is installed, and suspended in the ceiling space by fixing the suspending tags 103 to suspending bolts suspended from the back side of the ceiling.

Next, the internal construction of the housing 20 will be described with reference to FIGS. 1 to 3.

As shown in FIG. 2, a thermal insulating member 23 formed of foamed polystyrene is provided to the inner surface of the side plates 20a of the housing 20. A motor 22a is fixed to the inside of the top plate 20b of the housing 20, and a vane wheel 22b is secured to the shaft of the motor 22a. These elements constitute the air blowing fan 22. The indoor heat exchanger 21 which is bent in a substantially rectangular shape along the side plates 20a and 20e of the housing 20 is disposed inside the thermal insulating member 23 formed of foamed polystyrene so as to surround the air blowing fan 22 (see FIG. 3). Air is supplied from the air suction port 31 to the indoor heat exchanger 21 by the air blowing fan 22, and the air heat-exchanged in the indoor heat exchanger 21 is blown out from each air blow-out port 32.

As described above, the indoor heat exchanger 21 disposed in the housing 20 has the shape along the substantially octagonal frame constructed by the side plates, and the faces of the indoor heat exchanger 21 which face the side plates 20a, 20e are flat. A drain pan 24 of foamed polystyrene is disposed so as to be spaced from the edge of the indoor heat exchanger 21 at a predetermined distance. The outer periphery of the drain pan 24 is substantially in contact with the inner surface of the housing 20. The drain pan 24 is located below the indoor heat exchanger 21 under the installation state of the indoor unit 2 shown in FIG. 2, and it receives and stocks dew condensation water (drain water) dropped from the indoor heat exchanger 21 mainly under cooling operation. A drain pump 27 is disposed at the position corresponding to one corner of the indoor heat exchanger 21, and the drain water stocked in the drain pan 24 is pumped up by the drain pump 27. The drain water pumped up by the drain pump 27 is discharged to the outside of the indoor unit 2 by a drain pipe 27a passing through the cut-out portion 20f and extending to the outside of the housing 20. A joint pipe (refrigerant pipe) 35 (FIG. 1) extending from the indoor heat exchanger 21 is passed through the cut-out portion 27f (FIG. 1).

An air suction opening 25 and air blow-out openings 26 are provided at the positions corresponding to the air suction port 31 and the air blow-out ports 32 of the face panel 30. As shown in FIG. 3, the air suction opening 25 is formed in a substantially circular shape in plan view at the center of the substantially rectangular drain pan 24. Furthermore, the air blow-out openings 26 are formed along the four sides of the drain pan 24. The air blow-out openings 26 of the drain pan 24 are located at the positions corresponding to the flat portion of the indoor heat exchanger 21, and air is passed from the air blow-out openings 26 through the air blow-out ports 32 and blown out into the room to be air-conditioned.

Furthermore, a filtering unit 3 to which an air filtering unit 4, etc. are secured is inserted from the outside into the opening portion 20d formed at the knock-out hole portion 20c. In the air conditioner 100 according to the first embodiment, the knock-out hole portion 20c is opened in one side plate 20a adjacent to the one corner at which the drain pump 27 is disposed, out of the three side plates 20a constituting the housing 20 of the indoor unit 2, and the filtering unit 3 is disposed there.

The filtering unit 3 is equipped with a base plate (plate-like member) 3a which closes the opening portion 20d, the filtering unit 3 is inserted into the opening portion 20d, and the base plate 3a and the side plate 20a are fixed to each other, whereby the opening portion 20d is closed.

The air filtering unit 4 is secured to the base plate 3a before it is inserted into the housing 20. The air filtering unit 4 is supported 3a by fixing tags 61 so as to be spaced from the base plate 3a at a predetermined interval, and a thermal insulating member of foamed polystyrene is provided between the base plate 3a and the air filtering unit 4.

An electrolytic water supply unit 5, a water control valve 46, a check valve 47, a circulating pump 49, an electrical component board 40, etc. are secured to the outer surface of the base plate 3a at the outside of the housing 20.

The filtering unit 3 has a substantially box-shaped exterior cover 80 which covers the housing 20 from the outside. This exterior cover 80 is joined to the outside of the housing 20, and it accommodates the respective parts of the filtering unit 3 such as the electrolytic water supply unit 5, the water (tap water or the like) control valve 46, the check valve 47, the circulating pump 49 and the electrical component board 40.

Under the state that the filtering unit 3 is inserted and fitted in the opening portion 20d, the air filtering unit 4 is located so as to be adjacent to the indoor heat exchanger 21. The air filtering unit 4 is located at the outside of the indoor heat exchanger 21, so that air blown by the air blowing fan 22 and passing through the indoor heat exchanger 21 is blown to the air filtering unit 4. This air passes through the air filtering unit 4 while filtered (i.e., the virus, etc. contained in the air are inactivated, sterilized, decomposed or the like), flows downwardly in the space between the air filtering unit 4 and the base plate 3a, and is blown from the air blow-out ports 32 formed on the face panel 30 to the room to be air-conditioned). As described above, the thermal insulating member is disposed on the base plate 3a, and the air passing through the air filtering unit 4 downwardly flows in the space between the thermal insulating member and the air filtering unit 4, so that the temperature variation of the air in the filtering unit 3 can be suppressed to the minimum level.

Figure 4A:
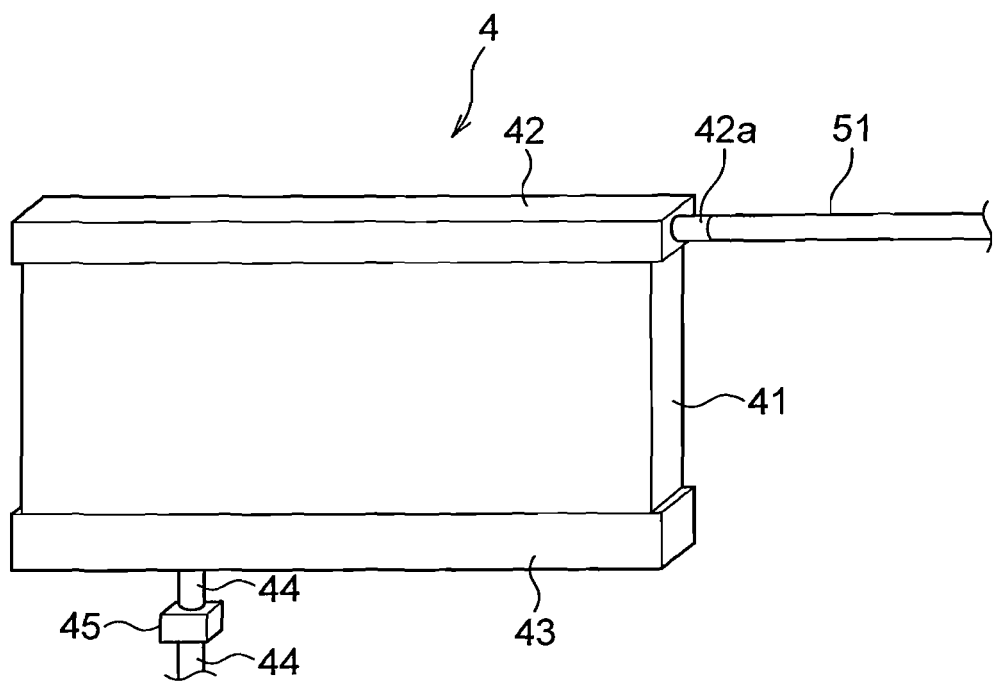
Figure 4B:
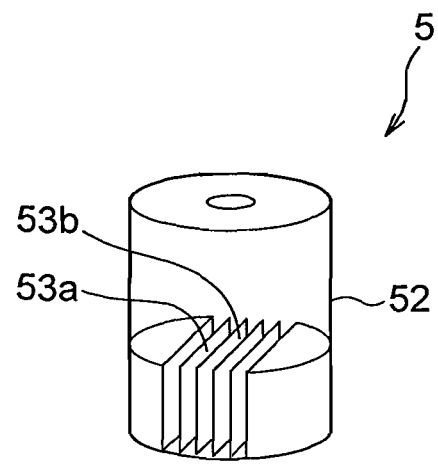

FIGS. 4A and 4B are diagrams showing the construction of the main part of the filtering unit 3. FIG. 4A shows the outlook of the air filtering unit 4, and FIG. 4B is a diagram showing the construction of the electrolytic water supply unit 5.

Figure 5:
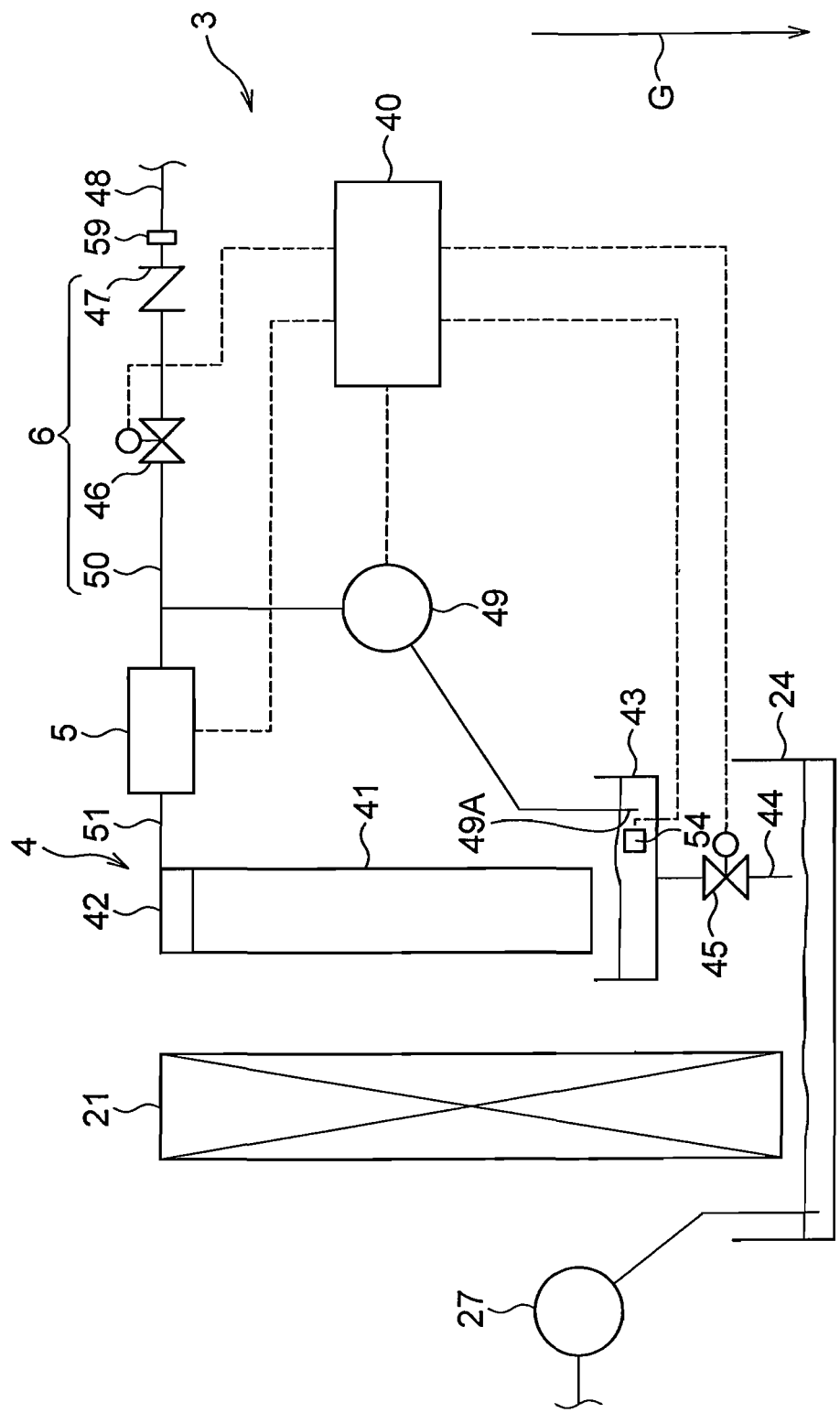
FIG. 5 is a systematic diagram showing the flow of electrolytic water passing through the air filtering portion of FIG. 4A.

FIG. 5 is a diagram showing the construction of the filtering unit 3. In FIG. 5, the indoor heat exchanger 21, the drain pan 24 and the drain pump 27 are illustrated for convenience of understanding, and a part of the filtering unit 3 is schematically illustrated. In FIG. 5, the direction indicated by an arrow G corresponds to the downward direction.

As shown in FIG. 4A, the air filtering unit 4 is equipped with a gas-liquid contact member (humidifying element) 41 having high water retentivity, and a water dispersing tray 42 disposed on the gas-liquid contact member 41 at the installation state of the indoor unit (FIG. 2). The gas-liquid contact member 41 is formed of non-woven cloth formed of acrylic fiber, polyester fiber or the like. A raw material having little reactivity to electrolytic water is preferably used as the raw material of the gas-liquid contact member 41, and further not only the above acrylic fiber, the polyester fiber, etc., but also other materials such as polyolefin-based resin (polyethylene resin, polypropylene resin or the like), vinyl chloride resin, fluorinated rein (PTFE, PFA, ETFE or the like), cellulose-based material, ceramics-based material, etc. may be used. The gas-liquid contact member 41 may be subjected to a hydrophilic treatment or the like to enhance the affinity of the gas-liquid contact member 41 to electrolytic water. Accordingly, the water retentivity (wettability) of the gas-liquid contact member 41 to electrolytic water is kept, and the air introduced to the gas-liquid contact member 41 can be surely brought into contact with electrolytic water.

The water dispersing tray 42 drops electrolytic water supplied from the electrolytic water supply unit 5 through an electrolytic water injection tube 51 to the gas-liquid contact member 41. A connection port 42a to which the electrolytic water injection tube 51 is connected is formed in the side surface of the water dispersion tray 42. Furthermore, many holes (not shown) through which electrolytic water is dropped and dispersed/infiltrated into the gas-liquid contact member 41 are formed in the bottom surface of the water dispersing tray 42. By dropping electrolytic water form the water dispersing tray 42 to the gas-liquid contact member 41, the electrolytic water is uniformly to the overall gas-liquid contact member 41.

The electrolytic water supplied to the gas-liquid contact member 41 and drops off the gas-liquid contact member 41 is stocked in an electrolytic water tray 43 described later.

The electrolytic water injection tube 51 introduces the electrolytic water generated in the electrolytic water supply unit 5 to the water dispersing tray 42.

As shown in FIG. 4B, the electrolytic water supply unit 5 has an electrolytic bath 52 supplied with water such as tap water or the like from an external water supply source. At least a pair of electrodes 53a, 53b are disposed in the electrolytic bath 52, and a voltage is applied to the electrodes 53a and 53b to electrolyze water and thus generate electrolytic water containing active oxygen species.

Here, the active oxygen species means oxygen molecules having higher oxidizing activity than normal oxygen and also related substance thereof, and contain not only so-called narrowly-defined active oxygen such as superoxide anion, singlet oxygen, hydroxyl radical and hydrogen peroxide, but also so-called broadly-defined active oxygen such as ozone, hypohalous acid (hypochlorous acid, etc.), etc.

As described above, the electrolytic bath 52 is fixed to one face of the base plate 3a and proximate to the gas-liquid contact member 41 disposed at the opposite surface of the base plate 3a, so that electrolytic water containing active oxygen species can be immediately supplied to the gas-liquid contact member 41 through the electrolytic water injection tube 51.

The electrodes 53a, 53b are two electrode plates each of which is constructed by a base of titan (Ti) and a coating layer of iridium (Ir), platinum (Pt), for example.

By applying a voltage between the electrodes 53a and 53b, hydrogen ions ($H^+$) and hydroxide ions ($OH^-$) in water react with each other at a cathode according to the following reaction formula (1):

$$4H^+ + 4e^- + (4OH^-) \rightarrow 2H_2 + (4OH^-) \quad (1)$$

Furthermore, water is electrolyzed at an anode according to the following reaction formula (2):

$$2H_2O \rightarrow 4H^+ + O_2 + 4e^- \quad (2)$$

At the same time, chlorine ions (chloride ions; Cl⁻) contained in water reacts according to the following reaction formula (3), and chlorine (Cl$_2$) is generated.

$$2Cl^- \rightarrow Cl_2 + 2e^- \quad (3)$$

Furthermore, Cl$_2$ thus generated reacts with water according to the reaction formula (4), and hypochlorous acid (HCLO) and hydrogen chloride (HCL) occur:

$$Cl_2 + H_2O \rightarrow HClO + HCl \quad (4)$$

The active oxygen species such as hypochlorous acid (HCLO) having strong sterilization power or the like is generated by supplying current between the electrodes 53a, 53b, and electrolytic water containing this active oxygen species is supplied to the gas-liquid contact member 41. By passing air through the gas-liquid contact member 41 under the above state, virus, etc. floating in the air passing through the gas-liquid contact member 41 concerned are inactivated and thus the air can be filtered. In addition, breeding of various bacterial, fungus, etc. in the gas-liquid contact member 41 itself can be prevented.

Gaseous materials which are causative agents of odor, etc. in the air are dissolved in the electrolytic water or react with active oxygen species such as hypochlorous acid or the like contained in the electrolytic water, whereby these materials are removed from the air when passing through the gas-liquid contact member 41, so that the air can be also deodorized by the gas-liquid contact member 41.

Furthermore, when current having a predetermined current density (for example, 20 mA/cm$^2$ or the like) is supplied between the electrodes 53a, 53b, electrolytic water containing active oxygen species having a predetermined concentration (for example, free residual chlorine concentration of 1 mg/l or the like) can be generated by electrolysis of water. Furthermore, by changing the current value, the concentration of the active oxygen species in the electrolytic water can be changed. As a specific example, when the current value is reduced, the concentration of hypochlorous acid of electrolytic acid can be reduced. On the other hand, when the current value is increased, the concentration of the hypochlorous acid of the electrolytic water can be increased.

In this embodiment, a water (tap water or the like) adjusting portion 6 including a connecting pipe 50, a water (tap water or the like) control valve 46 and a check valve 47 may be connected to the upstream side of the electrolytic water supply unit 5 as shown in FIG. 5.

FIG. 5 is a systematic diagram showing the flow of electrolytic water passing through the air filtering unit. In FIG. 5, the direction indicated by an arrow G corresponds to the downward direction.

The check valve 47 is connected to a water (tap water or the like) introduction pipe (water supply pipe) 48 through a connector 59. The water (tap water or the like) control valve 46 is disposed at the downstream side of the check valve 47. The opening/closing state and the opening degree of the water control valve 46 is adjusted under the control of an electrical component board 40 described later. The connecting pipe 50 intercommunicating with the water control valve 46 extends to the electrolytic water supply unit 5, and the electrolytic water supply unit 5 is supplied with water whose amount corresponds to the opening degree of the water control valve.

The water (tap water or the like) introduction pipe 48 extends to the neighborhood of the housing 20 along the joint pipe 35 and the drain pipe 27a passing through the cut-out potion 20f, and connects to the electrolytic water supply unit 5. Therefore, when the indoor unit 2 is installed while embedded in the ceiling, the connection work of the water introduction pipe 48, the joint pipe 35, the drain pipe 27a, etc. can be collectively performed, so that the labor required for the installation can be reduced.

Here, a water supply source which is located at the upstream side of the water (tap water or the like) introduction pipe 48 to supply water may be city water (tap water) or water stocked in a water supply tank or the like. Furthermore, the water stocked in the water supply tank or the like may be water containing ion species such as chloride ions or the like in advance like tap water or the like, or water containing a rare amount of ion species such as well water or the like. In the first embodiment, these kinds of water are collectively called as "water".

As shown in FIG. 5, the electrolytic water tray (water receiving tray) 43 is disposed below the gas-liquid contact member 41. The electrolytic water supplied from the water dispersing tray 42 to the gas-liquid contact member 41 drops from the gas-liquid contact member 41 to the electrolytic water tray 43, and the drop electrolytic water is stocked in the electrolytic water tray 43. The drain pipe 44 for guiding the stocked electrolytic water to the drain pan 24 is connected to the bottom surface of the electrolytic water tray 43. Both the ends of the electrolytic water tray 43 are mounted and fixed to the base plate 3a by the fixing tags 61 as shown in FIG. 2. As not shown, the gas-liquid contact member 41 is joined to the electrolytic water tray 43 by a stay (not shown) or the like, and supported by the base plate 3a.

The electrolytic water supplied from the electrolytic water supply unit 5 to the air filtering unit 4 is stocked in the electrolytic water tray 43. A suction nozzle 49A of the circulating pump 49 is disposed in the electrolytic water tray 43, and electrolytic water stocked in the electrolytic water tray 43 is pumped up by the circulating pump 49, and supplied to the electrolytic water supply unit 5 through the connecting pipe 50.

The drain pipe 44 connected to the lower portion of the electrolytic water tray 43 is equipped with a flow rate (or amount) control valve 45 as an electromagnetic valve, the flow rate control valve 45 is opened/closed or the opening degree thereof is adjusted under the control of the electrical component board 40 described later, and electrolytic water stocked in the electrolytic water tray 43 flows out to the drain pipe 44 in accordance with the opening degree of the flow rate control valve 45. The drain pipe 44 is opened above the drain pan 24, and the electrolytic water flowing out to the drain pipe 44 drops off to the drain pan 24. Accordingly, the electrolytic water stocked in the electrolytic water tray 43 is discharged in accordance with the opening degree of the flow rate control valve 45.

Furthermore, the electrolytic water tray 43 is provided with a flow switch 54 for detecting the water level of the stocked electrolytic water. The float switch 54 is connected to the electrical component board 40. When a low water level is detected by the float switch 54, that is, it is detected by the float switch 54 that the water level in the electrolytic water tray 43 is lower than a predetermined water level required to circulate electrolytic water, the electrical component board 40 opens the tap control valve 46 to supply tap water or the like to the electrolytic water supply unit 5.

The electrical component board 40 is equipped with CPU (not shown), ROM for storing a control program executed by CPU, control data associated with the control program, etc., and RAM for temporarily storing programs and various kinds of data which are processed by CPU, etc. CPU performs various kinds of control such as the current supply control for the electrodes 53a, 53b in the electrolytic water supply unit 5, the opening degree control of the flow rate control valve 45, the opening degree control of the water control valve 46, the driving control of the circulating pump 49, etc. according to the control program in ROM. For example, in order to generate electrolytic water of a predetermined concentration in the electrolytic water supply unit 5, CPU makes current flow between the electrodes 53a and 53b at the current density corresponding to the concentration concerned. Furthermore, in order to supply water from the water introduction pipe 48 to the electrolytic water supply unit 5, CPU adjusts the opening degree of the water control valve 46 and adjusts the opening degree of the flow rate control valve 45 to discharge the electrolytic water stocked in the electrolytic water tray 43. Furthermore, CPU drives the circulating pump 49 to circulate electrolytic water in the electrolytic water supply unit 5 and the air filtering unit 4.

Furthermore, CPU of the electrical component board 40 is connected to CPU of the controller 8 through a communication line or the like (not shown), and executes the above control according to an instruction input from the controller 8, for example, an instruction input in the remote controller. Accordingly, electrolytic water can be supplied to the air filtering unit 4 interlockingly with the cooling/heating operation of the outdoor unit 1 or independently of the cooling/heating operation of the outdoor unit 1.

Next, the operation of the air conditioner 100 according to the first embodiment will be described.

When an instruction of starting the operation is input through the remote controller (not shown) by a user, the controller 8 executes the operation based on the instructed operation mode (cooling operation mode/heating operation mode) and switches the four-way valve 13 of the outdoor unit 1 to the cooling side or the heating side to perform a predetermined air-conditioning operation such as cooling operation, heating, operation or the like as shown in FIG. 1.

When the cooling operation is carried out, the controller 8 switches the four-way valve 13 to the cooling side so that refrigerant flows in the refrigerant circuit 100a as indicated by a broken-line arrow of FIG. 1, the outdoor heat exchanger 14 functions as a condenser and the indoor heat exchanger 21 functions as an evaporator. Then, the controller 8 operates the air blowing fan 22 to suck an indoor air from the air suction pot 31, heat-exchanges the indoor air in the indoor heat exchanger 21 and supplies the cooled air to the air filtering unit 4 in the indoor unit 2. The air supplied to the air filtering unit 4 is blown out from the air blow-out ports 32 to a room to be air-conditioned.

When the heating operation is carried out, the controller 8 switches the four-way valve 13 to the heating side so that the refrigerant flows in the refrigerant circuit 100a as indicated by a solid-line arrow of FIG. 1, the outdoor heat exchanger 14 functions as an evaporator and the indoor heat exchanger 21 functions as a condenser. Then, the controller 8 operates the air blowing fan 22 to suck the indoor air from the air suction port 31, heat-exchanges the indoor air in the indoor heat exchanger 21 and supplies the heated (warm) air to the air filtering unit 4 (see FIG. 5). The air supplied to the air filtering unit 4 is blown out from the air blow-out pots 32 to the room to be air-conditioned.

Furthermore, at the same time when the air-conditioning operation is carried out, the controller 8 outputs an instruction to the electrical component board 40, and the air filtering operation is carried out under the control of the electrical component board 40. That is, the electrical component board 40 opens the water control valve 46 to supply water (tap water or the like) to the electrolytic water supply unit 5, and makes the electrolytic water supply unit 5 to electrolyze water, generate electrolytic water containing active oxygen species such as hypochlorous acid or the like and supply the generated electrolytic water to the air filtering unit 4. Furthermore, the electrical component board 40 drives the circulating pump 49 to circulatively supply the electrolytic water to the air filtering unit 4.

Through the air filtering operation, the air passing through the indoor heat exchanger 21 is brought into contact with the electrolytic water containing the active oxygen species on and in the gas-liquid contact member (element) 41 to thereby filter the air.

As described above, according to the first embodiment, in the indoor unit 2 of the in-ceiling embedded type air conditioner 100, air passing through the indoor heat exchanger 21 is passed through the gas-liquid contact member 41 into which electrolytic water infiltrates, so that virus, etc. contained in the air whose temperature is adjusted by cooling or heating can be inactivated or removed. Accordingly, the air conditioner 100 can be brought with the air filtering function, and it can simultaneously or individually implement both the air conditioning function and the air filtering function with no restriction in installation space, that is, the indoor unit and the air filtering unit can be assembled into one body. Furthermore, the air conditioner can also implement the air filtering function with no restriction in installation space on the floor surface of the room to be air-conditioned.

Furthermore, the opening portion 20d is formed in the side plate 20a constituting the side surface of the housing 20, and the air filtering unit 4 is inserted through the opening portion 20d into the housing 20, so that the air filtering unit 4 can be easily assembled to the indoor unit 2.

Furthermore, in the indoor unit 2, the electrolytic water supply unit 5 is disposed at the outside of the housing 20 and thus the air flow passage is not narrowed by the existence of the electrolytic water supply unit 5. Therefore, it does not induce unfavorable matters such as increase of air flow resistance or the like, and the space in the housing 20 can be effectively used. In addition, the maintenance of the electrolytic water supply unit 5 can be easily performed.

The filtering unit 3 is constructed by fixing the gas-liquid contact member 41 to one surface of the base plate 3a and also providing the electrolytic water supply unit 5 for generating electrolytic water, etc. to the other surface of the base plate 3a. Therefore, by fixing the base plate 3a to the side plate 20a, the air filtering unit 4 and the electrolytic water supply unit 5 can be easily secured to each other. Furthermore, the gas-liquid contact member 41 and the electrolytic water supply unit 5 are proximate to each other, and thus generated electrolytic water can be quickly supplied to the gas-liquid contact member 41.

In the first embodiment, the drain pump 27 is disposed at one corner of the housing 20, and the air filtering unit 4 is disposed along the side plate 20a adjacent to the locating position of the drain pump 27. Therefore, electrolytic water discharged to the drain pan 24 quickly reaches the drain pump and also it is quickly discharged to the outside of the indoor unit 2. Accordingly, the electrolytic water does not stay in the drain pan 24 for a long time, and thus the effect of the electrolytic water on the indoor heat exchanger 21 can be suppressed to the minimum level. Accordingly, for example, when an anticorrosive treatment is conducted on the indoor heat exchanger 21, the treatment area can be minimized.

In the first embodiment, the electrical component board 40 supplies the electrolytic water stocked in the electrolytic water tray 43 to the electrolytic water supply unit 5 by driving the circulating pump 49 even when the water control valve 46 is closed and the water supply from the water introduction pipe 48 is stopped. Accordingly, even when the electrolytic water supply unit 5 is stopped, electrolytic water is supplied to the air filtering unit 4, and also water can be efficiently used, so that the use amount of water can be saved. Furthermore, when the amount of circulating electrolytic water is reduced due to vaporization or the like, the low water level is detected by the float switch 54, so that the water control valve 46 is opened under the control of the electrical component board 40 to supply fresh water to the electrolytic water supply unit 5.

Electrolytic water stocked in the electrolytic water tray 43 passes through the drain pipe 44 and drops to the drain pan 24 by opening the flow rate control valve 45 under the control of the electrical component board 40. Here, the electrical component board 40 can drops electrolytic water stocked in the electrolytic water tray 43 to the drain pan 24 intermittently (for example, every hour or the like) or at all times on the basis of user's selection. The electrolytic water dropped to the drain pan 24 is discharged to the outside together with the drain water stocked in the drain pan 24 by the drain pump 27.

Accordingly, the electrolytic water circulated in the air filtering unit 4 and the electrolytic water supply unit 5 is periodically replaced by fresh water, and for example scales accumulated on the electrodes 53a, 53b of the electrolytic water supply unit 5 can be discharged. In addition, electrolytic water containing active oxygen species having sterilizing power flows into the drain pan 24, and thus breeding of various bacteria, etc. in the drain pan 24 can be effectively suppressed, so that cleanness can be kept in the drain pan.

Furthermore, in the first embodiment, one filtering unit 3 is secured to the indoor unit 2. However, another air filtering unit 3 may be easily added to the indoor unit 2. That is, each of the three side plates 20a constituting the housing 20 has the knock-out hole portion 20c, and filtering units 3 can be provided to all the three knock-out hole portions 20c. That is, three filtering units 3 may be assembled to the indoor unit of the first embodiment. This construction will be described hereunder as a second embodiment.

Second Embodiment

Figure 6:
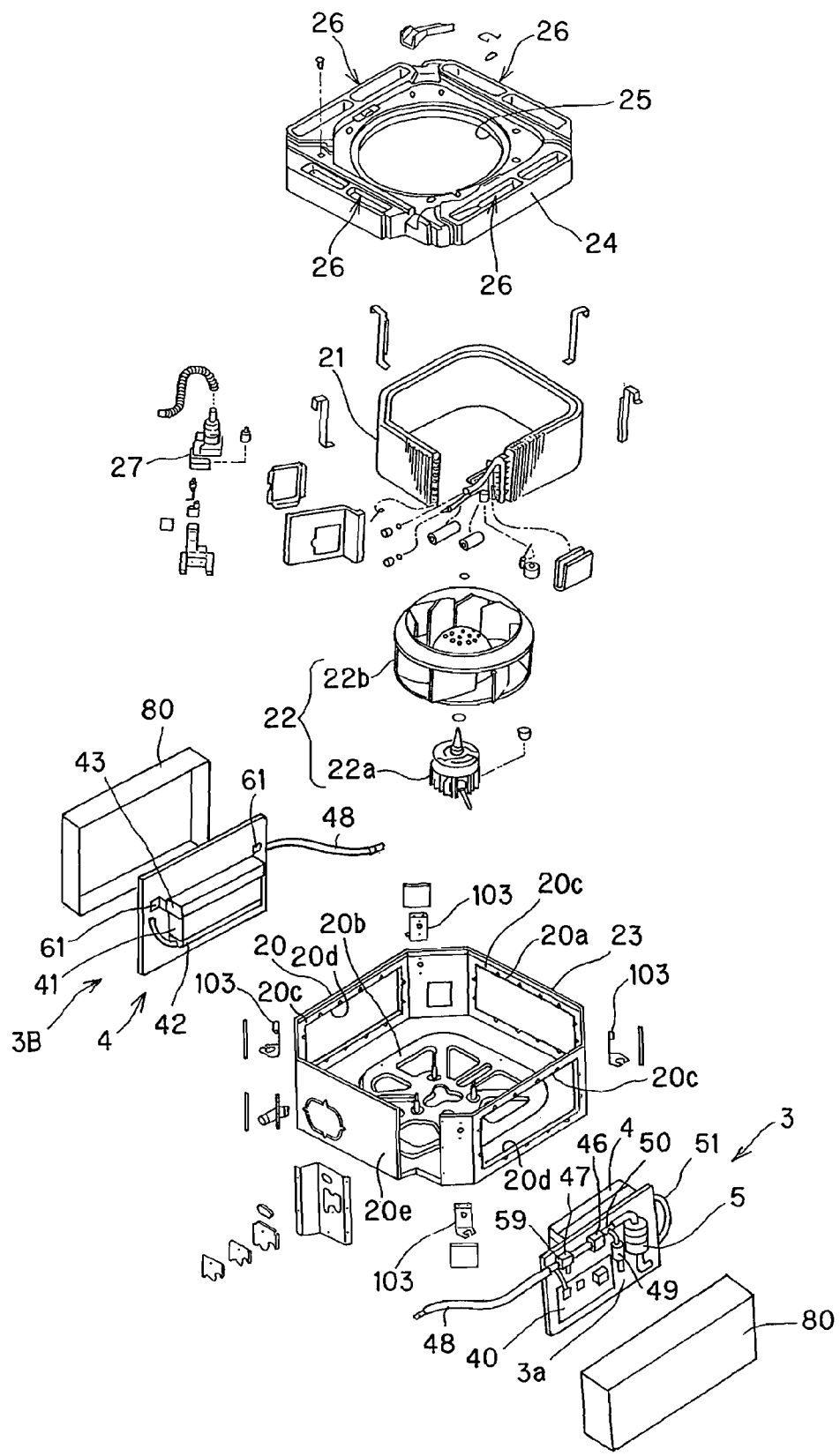
FIG. 6 is an exploded perspective view showing an indoor unit having an air filtering apparatus according to a second embodiment.

In the second embodiment, as shown in FIG. 6, the knock-out hole portions 20c of the confronting two side plates 20a are punched out to form opening portions 20d, and the filtering units 3 are disposed at the thus-formed two opening portions 20d. These filtering units 3 are designed to have the same construction as the filtering unit 3 described above. That is, each of the two filtering units 3 has a plate portion 3a which is fit to the opening portion 20d to close the opening 20d, and the air filtering unit 4 is secured to the inner surface of the plate portion 3a through fixing tags 61. The air filtering unit 4 is secured through the fixing tags 61, and thus a gap is provided between each air filtering unit 4 and the plate portion 3a. A thermal insulating member of foamed polystyrene is provided to the side surface of the inner surface of the plate portion 3a. On the other hand, the electrolytic water supply unit 5 described later, the water (tap water or the like) control valve, the check valve 47, the circulating pump 49, the electrical component board (control device) 40, etc are secured to the outside of the plate portion 3a. The outside of the filtering unit 3 is covered by the exterior cover 80.

According to the construction of the second embodiment, a larger rate of air to be blown out from the indoor unit 2 to the room to be air-conditioned can be filtered and thus the air filtering capability of the indoor unit 2 can be greatly enhanced.

As described above, the knock-out hole portions whose number corresponds to the required air filtering capability are punched out, and then the filtering units 3 whose numbers corresponds to the number of the punch-out knock-out hole portions are fitted to the indoor units through the knock-out hole portions, that is, the number of the filtering units 3 to be fitted to the indoor unit 2 is changed in accordance with the required filtering capability, thereby implementing the filtering capability which is conformed with the condition of the room to be air-conditioned. Accordingly, for example in a hospital, a school or a place which an unspecified number of persons enter and leave, a larger number of (for example, three) filtering units 3 are secured to the indoor unit 2 to implement higher air filtering capability. On the other hand, when the hermetically-sealed condition of a room is relatively high and thus a sufficient effect can be achieved with low air filtering capability, a smaller number of (for example, one) filtering unit 3 is secured to the indoor unit 2. The adjustment of the air filtering capability as described above can be easily implemented by a simple work of punching out the knock-out hole portion 20c and securing the filtering unit 3 to the indoor unit 2.

Third Embodiment

Figure 7:
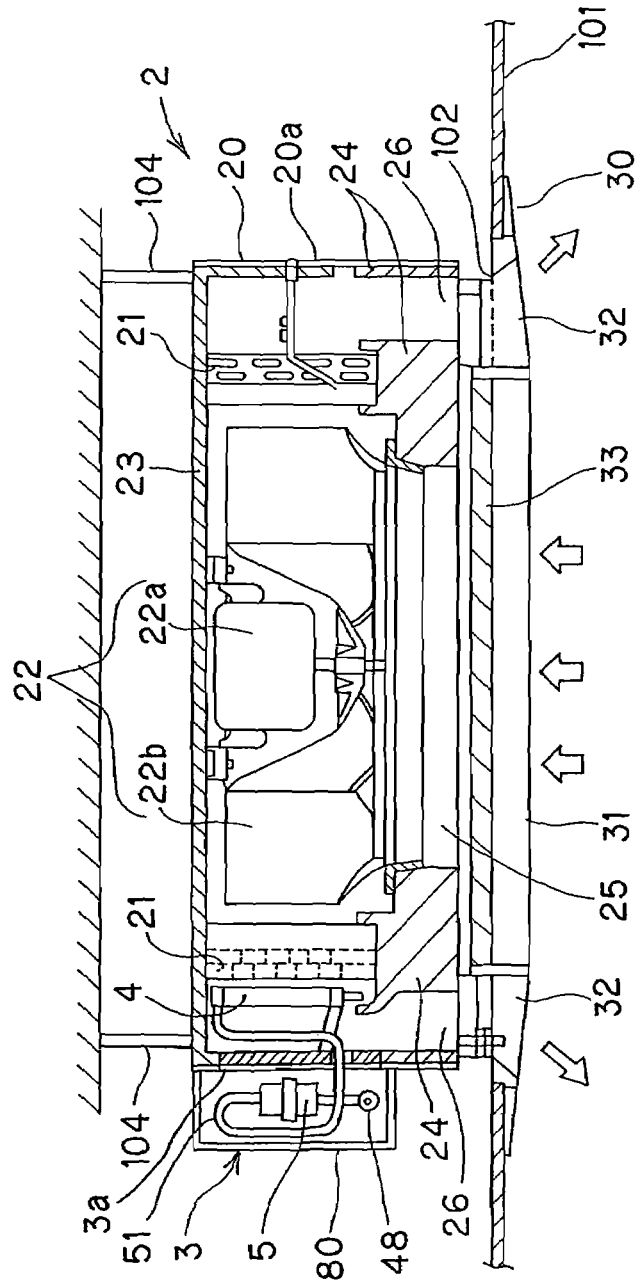
FIG. 7 is a cross-sectional view showing an indoor unit having an air filtering apparatus according to a third embodiment of the present invention.

FIG. 7 is a cross-sectional view of the indoor unit having the air filtering apparatus according to the third embodiment.

In the embodiment shown in FIG. 7, the electrolytic water supply unit 5 is not fixed to the base plate 3a unlike the first embodiment shown in FIG. 2. Therefore, the electrolytic water introducing tube 51 extending from the electrolytic water supply unit 5 to the gas-liquid contact member 4 is designed to upwardly project, downwardly turn once, penetrate through the base plate 3a and then reach the gas-liquid contact member 4. It is most preferable that the electrolytic water supply unit 5 is fixed to the base plate 3a as in the case of the first embodiment. However, by properly turning the electrolytic water introducing tube 51, the electrolytic water supply unit 5 may be disposed not to be fixed to the base plate 3a.

Fourth Embodiment

Net, a fourth embodiment of the present invention will be described.

According to the fourth embodiment, the operation mode is controlled in the constructions of the first to third embodiment. The air conditioner 1 according to the fourth embodiment may be implemented by using any construction of the first to third embodiments, however, the construction of the first embodiment shown in FIGS. 1 to 5 is used as a preferable example.

Figure 8:
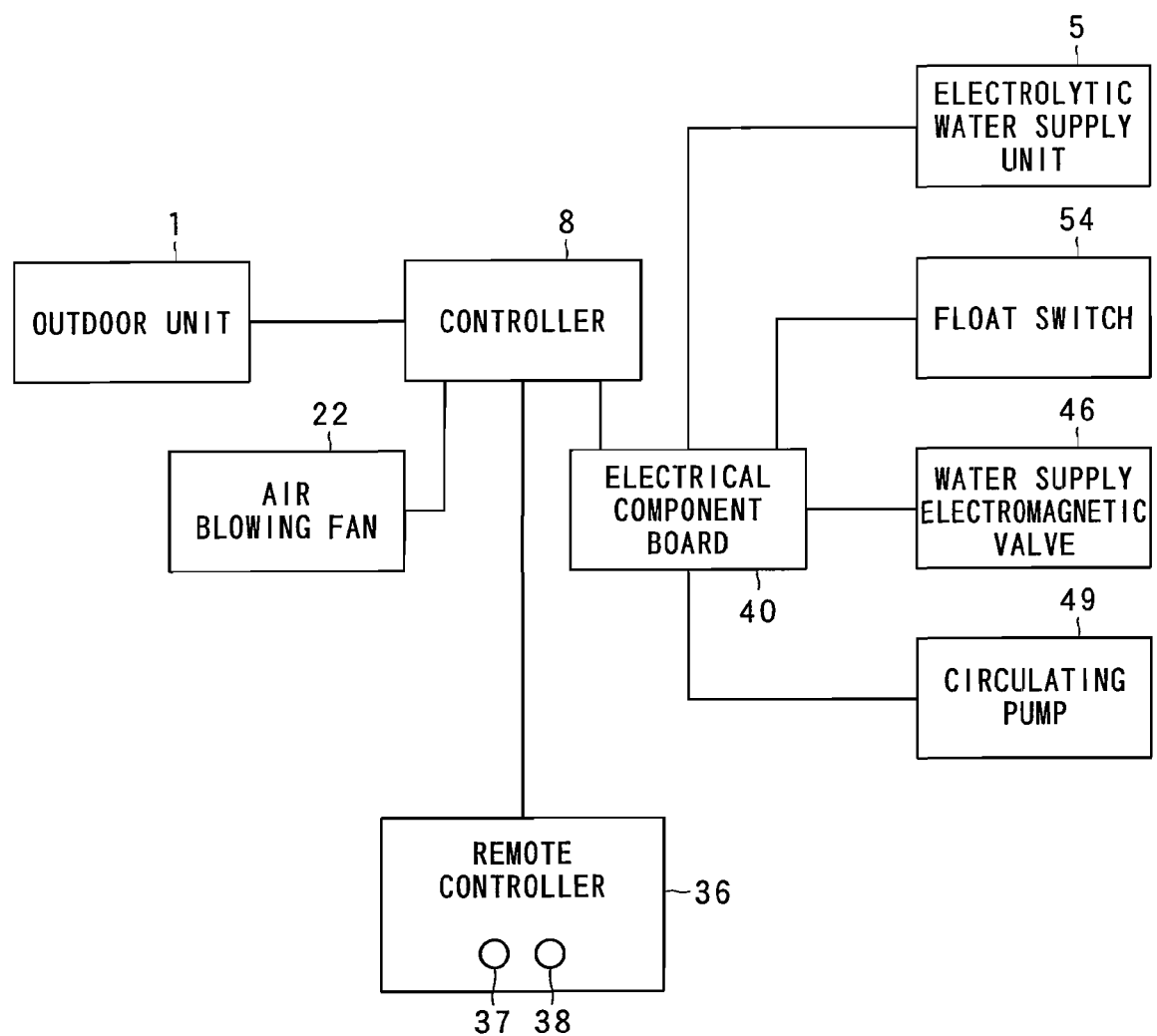
FIG. 8 is a block diagram showing an air filtering apparatus according to a fourth embodiment.

FIG. 8 is a block diagram showing the construction of the main part of the air conditioner according to the fourth embodiment.

The controller 8 stores the control program corresponding the operation mode of the air conditioner 100 and also controls the outdoor unit 1, the electrical component board 40, the air blowing fan 22, etc.

The controller 8 is supplied with various kinds of instructions from a user through a remote controller 36 for remote operation (hereinafter referred to as "remote controller").

The controller 8 inputs various kinds of operation instructions to the electrical component board 40, whereby the electrical component board 40 controls the electrolytic water supply unit 5, the float switch 54, the water (tap water or the like) control valve 46, the circulating pump 49, etc.

The float switch 54 detects the presence or absence of water in the electrolytic water tray 43 by detecting whether the electrolytic water tray 43 contains electrolytic water whose water level is equal to a predetermined permissible water level or more. When a detection signal indicating no water is input from the float switch 54 to the electrical component board 40, the electrical component board 40 opens the water control valve 46 and supplies tap water or the like to the electrolytic water unit until the presence of water is detected.

The remote controller 36 generates an instruction signal in accordance with a user's operation, and transmits the instruction signal to the controller 8. The remote controller 36 is equipped with at least an air-conditioning button 37 and an air filtering button (switching operation unit) 38.

The air-conditioning button 37 is a button for instructing an operation associated with the operation state of the indoor unit 2 by the user. The controller 8 controls the air-conditioning operation of the indoor unit 2 in response to the operation of this air-conditioning button 37.

Figure 9:
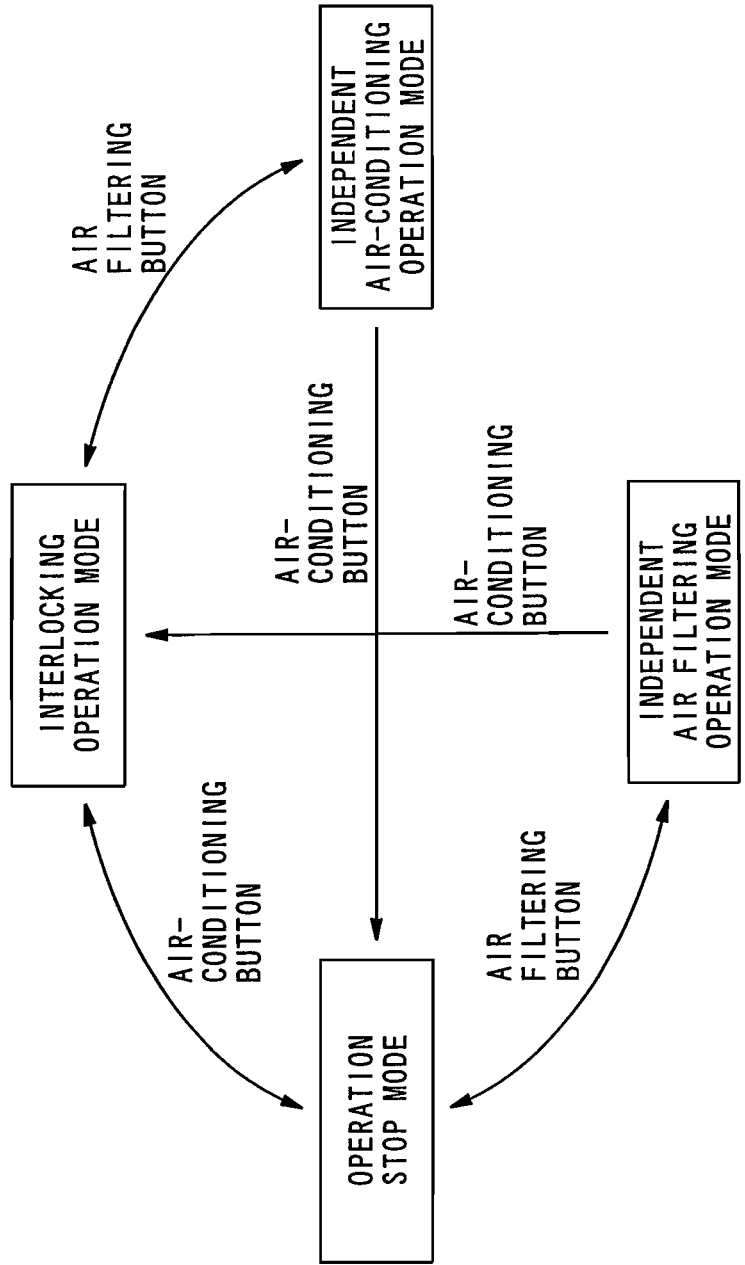
FIG. 9 is a state transition diagram showing transition of an operation mode of the air filtering apparatus shown in FIG. 8.

FIG. 9 is a state transition diagram of the operation mode of the air conditioner.

The air-conditioning operation based on the indoor unit 2 and the air filtering operation based on the filtering unit 3 are interlocked with each other. For example, when the air-conditioning button 37 is operated under the state that the air-conditioning operation is stopped, the operation mode is shifted to an interlocking operation mode of executing the air-conditioning operation and the air filtering operation at the same time.

When the air-conditioning button 37 is operated under the state that the air-conditioning operation of the indoor unit 2 is executed, the operation mode is shifted to an operation stop mode of stopping both the air-conditioning operation and the air filtering operation.

The air filtering button 38 instructs (start/stop of) the air filtering operation of the filtering unit 3 by user's operation.

When the air filtering button 38 is operated under the state that the air conditioner 100 operates in the interlocking operation mode in which the air-conditioning operation based on the indoor unit 2 and the air filtering operation based on the filtering unit 3 are executed, the interlocking operation mode is shifted to an independent air-conditioning operation mode in which only the air-conditioning operation is executed.

When the air filtering button 38 is operated under the state that the air conditioner 100 operates in the independent air-conditioning mode in which only the air-conditioning operation is executed by the indoor unit 2, the independent operation mode is shifted to the interlocking operation mode of executing both the air-conditioning operation and the air filtering operation.

When the air filtering button 38 is operated under the state that the air conditioner 100 stops both the air-conditioning operation and the air filtering operation in an operation stop mode, the indoor unit 2 is made to execute the air blowing operation based on the air blowing fan 22, and the operation stop mode is shifted to an independent air filtering operation mode of executing only the air filtering operation based on the filtering unit 3.

When the air filtering button 38 is operated under the state that the air conditioner 100 operates in the independent air filtering operation mode of executing only the air filtering operation based on the filtering unit 3 without air-conditioning operation, the independent air filtering operation mode is shifted to the operation stop mode.

FIG. 10 is a flowchart showing the operation of the indoor unit 2 when the remote controller is operated.

When the air conditioner 100 is powered on, the controller 8 judges whether the remote controller 36 is operated or not (step S1).

If it is judged in step S1 that the remote controller 36 is not operated (step S1: No), the controller 8 repeats the processing of the step S1 until the remote controller 36 is operated.

On the other hand, if it is judged in step S1 that the remote controller 36 is operated (step S1: Yes), the controller 8 judges whether the air-conditioning button 37 is operated or not (step S2).

If it is judged in step S2 that the air-conditioning button 37 is operated (step S2: Yes), the controller 8 judges whether the air conditioner 100 is under air conditioning operation (step S3).

If it is judged in step S3 that the air conditioner 10 is under air-conditioning operation (step S3: Yes), the controller 8 shifts the operation mode to the interlocking operation mode or the independent air-conditioning operation mode to the operation stop mode to stop the air-conditioning operation and the air filtering operation (step S5).

On the other hand, if it is judged in step S3 that the air conditioner 100 is not under air-conditioning operation (step S3: No), the controller 8 shifts the operation mode of the air conditioner 100 from the independent air filtering operation mode or the operation stop mode to the interlocking operation mode, and executes the air-conditioning operation and the air filtering operation (step S4).

If the air-conditioning button 37 is not operated in step S2 (step S2: No), the controller 8 judges whether the air filtering button 38 of the remote controller 36 is operated or not (step S6).

If it is judged in step S6 that the air filtering button 38 is not operated, that is, a button other than the air-conditioning button 37 and the air filtering button 38 is operated (step S6: No), the controller 8 executes the processing corresponding to the operated button concerned (step S7), and finishes a series of processing when the remote controller 36 is operated.

On the other hand, if it is judged in step S6 that the air filtering button 38 is operated (step S6: Yes), the controller 8 judges whether the air conditioner 100 is under air-conditioning operation (step S8).

If it is judged in step S8 that the air conditioner is under air-conditioning operation (step S8: Yes), the controller 8 judges whether the air conditioner 100 is under air filtering operation (step S9).

If it is judged in step S9 that the air conditioner 100 is not under air filtering operation (step S9: No), the controller 8 shifts the operation mode of the air conditioner 100 from the independent air-conditioning operation mode to the interlocking operation mode and executes both the air-conditioning operation and the air filtering operation (step S1).

If it is judged in step S9 that the air conditioner 100 is under air filtering operation (step S9: Yes), the controller 8 shifts the operation mode of the air conditioner 100 from the interlocking operation mode to the independent air-conditioning operation mode, and executes only the air-conditioning operation (step S10).

If the air conditioner 100 is not under air-conditioning operation in step S8 (step S8: No), it is judged whether the air conditioner 100 is under air filtering operation (step S12).

If it is judged in step S12 that the air conditioner 100 is under air filtering operation (step S12: Yes), the controller 8 shifts the operation mode of the air conditioner 100 from the independent air filtering operation mode to the operation stop mode, and stops the air filtering operation (step S14).

On the other hand, if it is judged in step S12 that the air conditioner 100 is not under air filtering operation (step S12: No), the controller 8 shifts the operation mode of the air conditioner 100 from the operation stop mode to the independent air filtering operation mode, and executes the air filtering operation without executing the air-conditioning operation (step S13).

Through the above processing, when the user operates the air-conditioning button 37, the controller 8 switches the interlocking operation mode and the operation stop mode therebetween in accordance with the operation. At this time, the air-conditioning operation based on the indoor unit 2 and the air filtering operation based on the filtering unit 3 are interlocked with each other, and thus the air filtering operation can be executed interlockingly with the air-conditioning operation, or the air filtering operation can be stopped interlockingly with stop of the air-conditioning operation.

Furthermore, when the air filtering button 38 is operated under the state that the air conditioner 100 is under air-conditioning operation, the controller 8 switches the interlocking operation mode and the independent air-conditioning operation mode therebetween. Therefore, the execution/stop of only the air filtering operation based on the filtering unit 3 can be switched to each other under the state that the air-conditioning operation is maintained. More specifically, when the air filtering button 38 is operated under the interlocking operation mode, the mode is switched to the independent air-conditioning mode. When the air filtering button 38 is operated under the independent air-conditioning mode, the mode is switched to the interlocking operation mode.

Furthermore, when the air filtering button 38 is operated under the state that the air conditioner 100 is not under air-conditioning operation, the controller 8 switches the operation stop mode and the independent air filtering operation mode therebetween, and thus the execution/stop of the air filtering operation based on the filtering unit 3 can be switched to each other without executing the air-conditioning operation. More specifically, when the air filtering button 38 is operated under the operation stop mode, the mode is shifted to the independent air filtering operation mode, and the air blowing operation based on the air blowing fan and the air filtering operation based on the filtering unit 3 are executed. When the air filtering button 38 is operated under the independent air filtering operation mode, the mode can be switched to the operation stop mode.

According to the fourth embodiment, the air conditioner 100 is provided with the interlocking operation mode in which the air-conditioning operation based on the indoor unit 2 and the air filtering operation based on the filtering unit 3 are interlocked with each other. Accordingly, if the user merely pushes the air-conditioning button 37 of the remote controller 36 only once, the operation mode of the air conditioner 100 is shifted to the interlocking operation mode and the air-conditioning operation is executed. Furthermore, interlockingly with the air-conditioning operation, the air filtering operation based on the filtering unit 3 is executed. Therefore, it is unnecessary to execute plural operations, and both the air-conditioning operation and the air filtering operation can be executed by only one operation, so that the operationality can be enhanced.

Furthermore, the air conditioner 100 is provided with the independent air filtering operation mode in which only the air filtering operation based on the filtering unit 3 is executed. Accordingly, if the user merely pushes the air filtering button 38 only once when the air conditioner 100 is not under air-conditioning operation, the operation stop mode is switched to the independent air filtering operation mode, the air blowing operation based on the air blowing fan 22 of the indoor unit 2 is executed, and also the air filtering operation based on the filtering unit 3 is executed. Therefore, it is unnecessary to execute plural operations, and the operation mode can be shifted to the independent air filtering operation mode by only one operation, so that the operationality can be enhanced.

Still furthermore, when the operation mode is shifted to the independent air filtering operation mode, it is unnecessary to provide a dedicated air blowing fan for the filtering unit 3 because the air blowing fan 22 of the indoor unit 22 is driven, so that the number of parts can be reduced.

Still furthermore, according to the fourth embodiment, the air conditioner 100 switches the interlocking operation mode and the independent air-conditioning operation mode therebetween by operating the air filtering button 38 under air-conditioning operation. Therefore, under the state that the air-conditioning operation is maintained, the execution and stop of only the air filtering operation based on the filtering unit 3 can be switched therebetween.

The present invention is not limited to the above embodiments. In the first to fourth embodiments, hypochlorous acid is generated as the active oxygen species. However, ozone ($O_3$) and hydrogen peroxide ($H_2O_2$) may be generated as the active oxygen species. In this case, when platinum tantalum electrodes are used as the electrodes 53a, 53b, active oxygen species can be highly efficiently generated from even ion-species rare water by electrolysis.

That is, by supplying current between the electrodes 53a, 53b, the reactions indicated by the following reaction formulas (5) to (7) occurs at the anode, and ozone is generated.

$$2H_2O \rightarrow 4H^+ + O_2 + 4e^- \quad (5)$$

$$3H_2O \rightarrow O_3 + 6H^+ + 6e^- \quad (6)$$

$$2H_2O \rightarrow O_3 + 4H^+ + 4e^- \quad (7)$$

Furthermore, at the cathode, the reactions indicated by the following reaction formulas (8) and (9) occur, and $O_2^-$ generated by the electrode reaction and $H^+$ in the solution are coupled to each other to generate hydrogen peroxide ($H_2O_2$).

$$4H^+ + 4e^- + (4OH^-) \rightarrow 2H_2 + (4OH^-) \quad (8)$$

$$O_2^- + e^- + 2H^+ \rightarrow H_2O_2 \quad (9)$$

In the construction of this embodiment, by making the current flow between the electrodes 53a, 53b, ozone and hydrogen peroxide having strong sterilizing power are generated, and electrolytic water containing ozone and hydrogen peroxide can be made. The concentration of ozone or hydrogen peroxide in the generated electrolytic water is adjusted to a concentration optimal to inactivate target virus, etc., and air is passed through the gas-liquid contact member 41 supplied to the electrolytic water of the concentration concerned, whereby the target virus, etc. floating in the air can be inactivated. Furthermore, when gaseous materials such as odor, etc. are passed through the gas-liquid contact member 41, they are dissolved in the electrolytic water or react with ozone or hydrogen peroxide in the electrolytic water to be removed from the air, whereby the air can be deodorized.

In the indoor unit 2, the same reactions can be also induced even when ion-species rare water (pure water, purified water, well water, some kinds of tap water or the like) are used. That is, if a halogen compound (salt or the like) is added to ion-species rare water, the same reactions as (3) and (4) occur, and the active oxygen species can be achieved. That is, the air filtering apparatus 1 is not limited to tap water containing a sufficient amount of chloride compound, and even when other water is used, a sufficient air cleaning effect (inactivation, sterilization, deodorization, etc. of virus, etc.) can be exercised.

In this case, water introduced into the electrolytic bath 52 may be supplied with chemical compounds (for example, halide or the like). For example, a chemical compound supply device for supplying the above chemical compound may be provided in the indoor unit 2. This chemical compound supply device may be designed to inject a chemical compound on the passage from the water (tap water or the like) introducing pipe 48 to the electrolytic bath 52, or directly inject the chemical compound into the electrolytic bath 52, or supply the concentration-adjusted chemical compound from the water (tap water or the like) introducing pipe 48 into the indoor unit 2.

Here, salt or brine may be used as the chemical compound. For example, if the concentration of brine in the electrolytic bath 52 is adjusted to 2 to 3% (weight percentage), electrolytic water containing hypochlorous acid or hydrogen peroxide (0.5% to 1%) can be generated by electrolyzing brine in the electrolytic bath 52. According to this construction, even when ion species in water introduced into the electrolytic bath 52 is rare, the amount of the ion species can be increased by adding salt or brine, whereby active oxygen species can be generated stably and highly efficiently in the electrolysis process of water.

Furthermore, in each of the above embodiments, the four-way blow-out and in-ceiling embedded type air conditioner is used as an example of the air conditioner. However, the present invention is not limited to this type, and the present invention may be applied to a one-way or two-way air conditioner, or a non-in-ceiling embedded type such as a wall-suspended type air conditioner or the like.

Still furthermore, in each of the embodiments, electrolytic water passing through the air filtering unit 4 is circulated and reused by providing the circulating pump 49. However, the present invention is not limited to these embodiments, and the electrolytic water passing through the air filtering unit 4 may be directly discharged without circulating and reusing the electrolytic water by the circulating pump 49.

In the fourth embodiment, the independent air-conditioning operation mode and the interlocking operation mode are switched therebetween, and the operating button for switching the execution and stop of the air filtering operation under the air-conditioning operation, and the air filtering button 38 is set as a common button serving as the operating button for switching the independent air filtering operation mode and the operation stop mode therebetween and executing the independent operation/stop of the air filtering operation based on the filtering unit 3 under non-air-conditioning operation. However, the present invention is not limited to this style, and these operation buttons may be provided as individual modes to the remote controller 36.

In the construction of each of the above-described embodiments, the material constituting the drain pan 24 and the detailed construction such as the shape, etc. of the indoor heat exchanger 21 may be arbitrarily changed.

What is claimed is:

1. An in-ceiling embedded indoor unit of an air conditioner including an air blower and an indoor heat exchanger accommodated in a housing having a box-shape, comprising:
   knock-out hole portions that are formed in side surfaces of the housing capable of being freely pushed out forming opening portions; and
   a filtering unit of the indoor unit that comprises an assembly of a plate-shaped member detachable from the housing, an electrolytic bath for generating the electrolytic water by electrolyzing water, a controller controlling current supply in the electrolytic bath and a gas-liquid contact member infiltrated with the electrolytic water on an air blowing passage through which air sucked by the air blower flows in the indoor unit, the air and the electrolytic water being brought into contact with each other in the gas-liquid contact member to filter the air;
   wherein the filtering unit is positioned in one of the opening portions, the plate-shaped member closing the opening portion, and the gas-liquid contact member is disposed at a downstream side of the indoor heat exchanger,
   the assembly of the filtering unit having the gas-liquid contact member fixed to an inner surface of the plate-shaped member at the inside of the housing, and the electrolytic bath and the controller are fixed to the outer surface of the plate-shaped member at an outside of the housing, and
   the assembly of the filtering unit is configured to be detachable from the housing.

2. The indoor unit according to claim 1, wherein the filtering unit further comprises a water supply pipe that is disposed along a refrigerant pipe connected to the indoor heat exchanger and supplies water to the electrolytic bath.

3. The indoor unit according to claim 1, wherein the electrolytic bath is disposed at the outside of the housing.

4. The indoor unit according to claim 3, wherein the filtering unit further comprises a water supply pipe that is disposed along a refrigerant pipe connected to the indoor heat exchanger and supplies water to the electrolytic bath.

5. The indoor unit according to claim 1, wherein the filtering unit comprises a drain pan that is disposed below the indoor heat exchanger and receives drain water from the indoor heat exchanger, a drain pump for discharging drain water from the drain pan, an electrolytic water supply unit for supplying the electrolytic water to the gas-liquid contact member from the upper side thereof so that the electrolytic water infiltrates the gas-liquid contact member, an electrolytic water tray that is disposed below the gas-liquid contact member and receives electrolytic water dropped from the gas-liquid contact member, and a discharge pipe for discharging electrolytic water stocked in the electrolytic water tray to the drain pan.

6. The indoor unit according to claim 5, wherein the drain pump is disposed at one corner of the housing, and the gas-liquid contact member is disposed along a side surface of the housing so as to be adjacent to the locating position of the drain pump.

7. The indoor unit according to claim 5, wherein the filtering unit further comprises a circulating and supplying unit for circulating and supplying electrolytic water stocked in the electrolytic water tray to the gas-liquid contact member.

8. The indoor unit according to claim 5, wherein the discharge pipe is equipped with a flow rate control valve, and the controller controls opened and closed control of the flow rate control valve.

9. The indoor unit according to claim 1, wherein the controller is disposed on a side of the electrolytic bath and on an upper side of a water supply pipe that is installed on the plate-shaped member and that supplies water to the electrolytic bath from a lower side thereof.

* * * * *